United States Patent [19]

Yamamoto et al.

[11] Patent Number: 5,438,367
[45] Date of Patent: Aug. 1, 1995

[54] STILL VIDEO CAMERA AND DEVICE FOR ADJUSTING CONTROL DATA FOR AMOUNT OF STROBE EMISSION

[75] Inventors: Masanaga Yamamoto; Kiyotaka Kaneko; Minoru Arai; Takashi Soga, all of Asaka, Japan

[73] Assignee: Fuji Photo Film Co., Ltd., Kanagawa, Japan

[21] Appl. No.: 233,346

[22] Filed: Apr. 26, 1994

[30] Foreign Application Priority Data

Apr. 26, 1993 [JP] Japan .................................. 5-120444

[51] Int. Cl.⁶ .......................................... H04N 5/235
[52] U.S. Cl. ..................................... 348/371; 354/415
[58] Field of Search ........................ 348/370, 371, 216; H04N 5/235; 354/413, 415, 416

[56] References Cited

U.S. PATENT DOCUMENTS

5,231,447 7/1993 Takagi ................................ 354/415
5,257,063 10/1993 Ishimura et al. ..................... 354/416

*Primary Examiner*—Wendy R. Greening

[57] ABSTRACT

An amount-of-light-emission control data for controlling the amount of light-emission is corrected so that the amount of strobe light-emission becomes proper. In the adjustment process after manufacturing a digital still camera, a subject is placed in a predetermined position, and is photographed by determining a predetermined guide number GN. A guide number GN corresponding to the amount of light-emission of a strobe 45 is calculated from a video signal obtained by the photography. The predetermined actual guide number GN and the guide number GN corresponding to the actual amount of light-emission are compared with each other, to correct the value of control data for determining the amount of light-emission so that there is no difference therebetween. The corrected or updated value of control data in which the predetermined updated corrected guide number GN and the guide number GN corresponding to the actual amount of light-emission are approximately equal to each other is stored in a memory 6. At the time of actual photography, the updated corrected value of control data is read out from the memory 6 in conformity with the updated corrected guide number GN, and the data read out is applied to an amount-of-light-emission control circuit 30, so that a strobe flash is fired.

10 Claims, 9 Drawing Sheets

| GUIDE NUMBER GN | CONTROL DATA FOR AMOUNT OF EMISSION | VOLTAGE (mV) |
|---|---|---|
| 10.5 | 15 | 300 |
| 9.5 | 30 | 600 |
| 8.5 | 45 | 900 |
| 7.5 | 60 | 1200 |
| 6.5 | 75 | 1500 |
| 5.5 | 90 | 1800 |

STILL VIDEO CAMERA AND DEVICE FOR ADJUSTING CONTROL DATA FOR AMOUNT OF STROBE EMISSION

BACKGROUND OF THE INVENTION

1. Field of the Invention

The present invention relates to a still video camera and a method of controlling the same, as well as a device for and a method of adjusting control data for amount of strobe emission.

2. Description of the Background Art

The amount of strobe emission is represented by a guide number, and the guide number is practically determined by the product of the distance to a subject and an F-number.

The distance to a subject is measured, and a guide number is determined from the measured distance to the subject and the F-number. Control data for amount of strobe emission corresponding to the determined guide number is applied to a strobe light-emission control circuit. The strobe light-emission control circuit controls a strobe flash device, which fires a strobe flash using an amount of emission represented by the guide number.

However, there is dispersion for each product in the manufacturing processes of a still video camera. Even if control data for determining the amount of strobe emission corresponding to the guide number is applied to the strobe light-emission control circuit, therefore, a slight error in emission occurs. Therefore, the amount of strobe emission must be corrected for each product.

Particularly in a still video camera, a CCD having a relatively narrow dynamic range is used as an imaging device. Consequently, proper exposure control at the time of photography is required. In photography with a strobe flash, therefore, the strobe flash must be fired to provide a proper amount of emission.

Conventionally, photography has been performed under strobe flashing in the adjustment process before shipment to reproduce a video signal obtained and to judge whether or not the amount of strobe emission is proper by seeing a reproduced image. If the amount of strobe emission is not proper, a flash circuit constant is adjusted.

Since reproduction processing must be performed, adjustment work is complicated. The adjustment work takes relatively long and requires skilled techniques.

SUMMARY OF THE INVENTION

An object of the present invention is to establish a strobe flash of a proper amount of emission in a still video camera.

A device for adjusting control data for determining the amount of strobe emission in a still video camera according to a first aspect of the present invention is characterized by comprising photographing means for photographing a subject to output a video signal representing an image of the subject, guide number calculating means for calculating a guide number as a function of the distance to the subject and an F-number, storing means for storing an initial value for controlling the amount of strobe light-emission of a strobe flash device in conformity with the guide number, strobe light-emission control means for reading out from the storing means control data for determining the amount of strobe light-emission corresponding to the guide number calculated by the guide number calculating means to so control the strobe flash device as to fire a strobe flash to provide an amount of strobe light-emission of which corresponds to the initial control data value strobe-light-emission detecting means for detecting the actual amount of strobe light-emission of the strobe flash device on the basis of the video signal representing the image of the subject which is outputted from the photographing means by the photography of the subject irradiated with strobe light, judging means for judging whether or not the difference between the amount of strobe light-emission detected by the strobe-light-emission detecting means and the amount of strobe light-emission represented by the guide number is within an allowable range, and correcting means for updating the initial value of control data for determining the amount of strobe light-emission which is stored in the storing means so that the difference between the amounts of strobe light-emission is within the allowable range.

A method of adjusting control data for amount of strobe light-emission in a still video camera according to a first aspect of the present invention comprises the steps of storing an initial value for controlling the amount of strobe light-emission of a strobe flash device in conformity with a guide number, calculating the guide number from the distance to a subject to be photographed and an F-number of the camera, reading out the previously stored initial value of control data corresponding to the calculated guide number to fire a strobe flash to provide an amount of strobe light-emission corresponding to the initial value of control data photographing the subject under the strobe flashing to obtain a video signal representing an image of the subject, detecting the amount of strobe light-emission on the basis of the obtained video signal, judging whether or not the difference between the detected amount of strobe light-emission and the amount of strobe light-emission represented by the calculated guide number is within an allowable range, and updating the initial value of control data so that the difference between the amounts of strobe light-emission is within the allowable range.

According to the first aspect of the present invention, the strobe flash is fired in conformity with the value of control data for determining the amount of strobe light-emission corresponding to the guide number in the adjustment process after manufacturing the still video camera to photograph the subject. The amount of strobe light-emission is detected from the video signal obtained by the photography to detect the difference between the detected amount of strobe light-emission and the amount of strobe light-emission represented by the guide number. The initial value of control data for determining the amount of strobe light-emission is so corrected so that the difference between the amounts of strobe light-emission is within the allowable range.

When the strobe photography is conducted using the still video camera, the corrected (updated) value of control data for determining the amount of strobe light-emission corresponding to the guide number is used. Since the control data, the amount of strobe light-emission becomes proper, so that relatively proper exposure control is carried out.

The processing for strobe flashing, the processing for detecting the amount of strobe light-emission, the processing for judgment and the processing for correction are preferably repeated until it is judged that the difference between the amounts of strobe light-emission is within the allowable range.

The control data for determining the amount of strobe light-emission may be composed of a value corresponding to the guide number and a correction value or may be a value used for directly controlling the strobe flash device.

A still video camera according to a second aspect of the present invention is characterized by comprising rangefinding means for measuring the distance to a subject, guide number calculating means for calculating a guide number as a function of the distance to the subject measured by the rangefinding means and an F-number of the camera, a strobe flash device for projecting strobe light on the subject, storing a means for storing corrected value of control data for determining the amount of strobe light-emission in which the difference between the amount of strobe light-emission of the strobe flash device which flashes a strobe on the basis of the guide number and the amount of strobe light-emission represented by the guide number is within an allowable range in conformity with the guide number, strobe light-emission control means for reading from the storing means the corrected value of control data to control the strobe flashing by the strobe flash device on the basis of the corrected value of control data, photographing means for photographing the subject under the strobe flashing by the strobe flash device to output a video signal representing an image of the subject, and recording means for recording the video signal outputted from the photographing means on a recording medium.

A method of controlling a still video camera according to a second aspect of the present invention comprises the steps of measuring the distance to a subject from the camera, calculating a guide number as a function of the measured distance to the subject and an F-number of the camera, storing in storing means the corrected value of control data for determining the amount of strobe light-emission of a strobe flash device which flashes a strobe on the basis of the guide number and the amount of strobe light-emission represented within an allowable range in conformity with the guide number, reading from the storing means the corrected value of control data, firing the strobe flash control by the strobe flash device on the basis of the corrected value of control data, photographing the subject under the strobe flashing to obtain a video signal representing an image of the subject, and recording the obtained video signal on a recording medium.

The second aspect of the present invention is directed to a still video camera for firing the strobe flash on the value of basis of the control data for determining the amount of strobe light-emission corrected by the device for and the method of adjusting the value of control data for determining the amount of strobe light-emission in the still video camera to photograph the subject and the control method therefor.

According to the second aspect of the present invention, the corrected value of control data is stored, and the corrected control value of data is read, so that the strobe flash is fired.

Since the value of control data for determining the amount of strobe light-emission corresponding to the guide number has been already corrected, the strobe flash of a proper amount of light emission is achieved. Consequently, proper exposure control is carried out and the subject can be photographed.

DESCRIPTION OF THE PREFERRED EMBODIMENTS

An embodiment in which the present invention is applied to a digital still camera will be described in detail with reference to the drawings.

Figure 1:
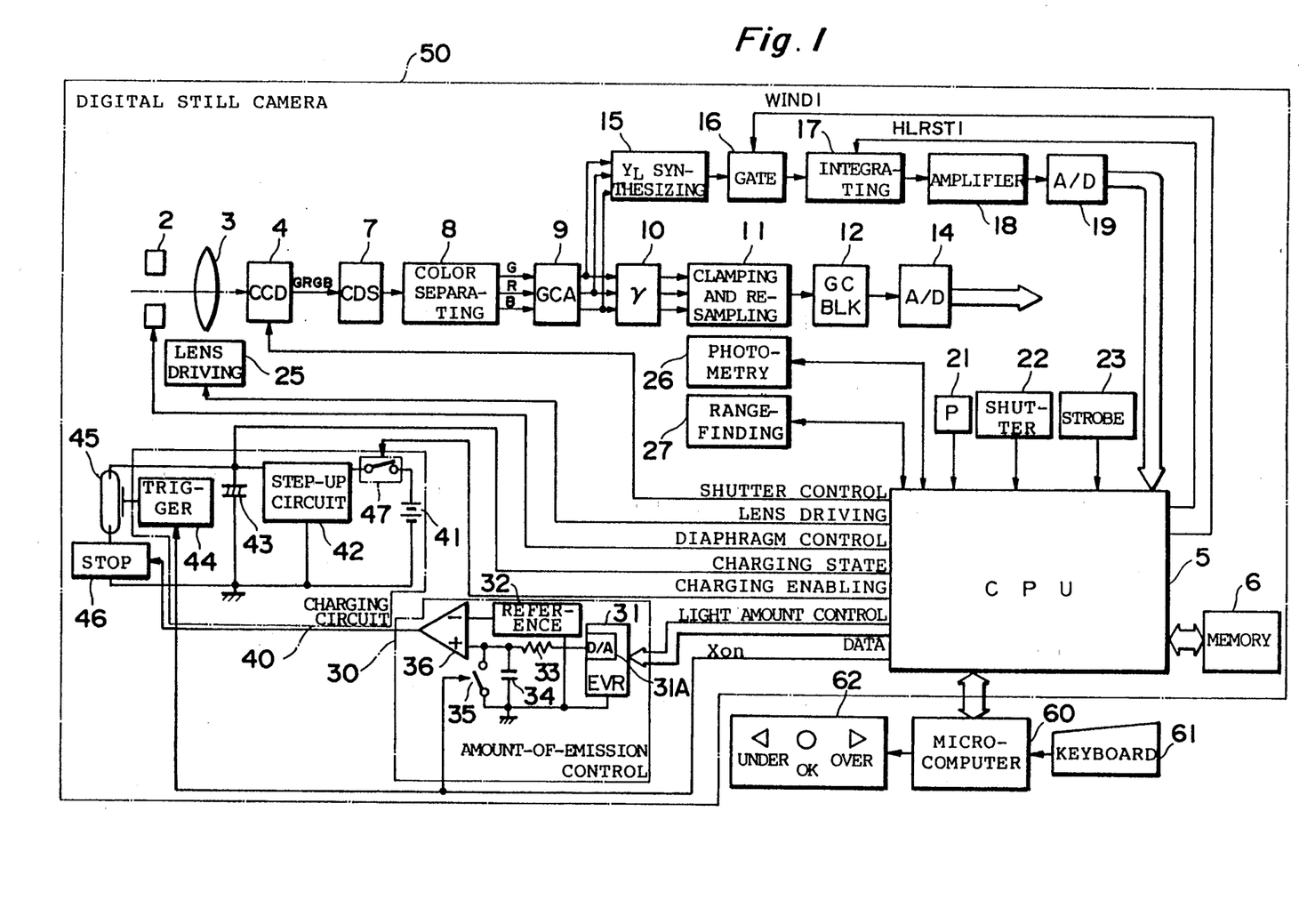
FIG. 1 is a block diagram showing the electrical configuration of a digital still camera.

FIG. 1 is a block diagram showing the electrical configuration of a digital still camera according to an embodiment of the present invention.

An imaging optical system comprises a diaphragm 2, an imaging lens 3, and a CCD (Charge Coupled Device) 4 serving as a solid state electronic image sensing device (an image sensor). Although a mechanical shutter is provided if required, a shutter function is generally implemented by an electronic shutter realized by control of the CCD 4. The imaging lens 3, which forms an image of a subject to be pick-up on the CCD 4, is moved by an imaging lens driving device 25 controlled by an CPU 5, thereby being positioned at its focusing position.

The digital still camera is provided with a power supply switch 21, a shutter release button 22, and a strobe photographing switch 23, and signals respectively representing input from the power supply switch 21. Depression of the shutter release button 22 and setting of the strobe photographing switch 23 are applied to the CPU 5. The shutter release button 22 is of a two-stage stroke type, which is depressed in the first stage to perform photometry and rangefinding and is depressed in the second stage to perform actual photography of the subject.

The digital still camera is provided with a photometric sensor 26 for the purpose of preparatory photometry, and photometric data is applied to the CPU 5. The CPU 5 controls at least one of an F-number and a shutter speed on the basis of the photometric data obtained from the photometric sensor 26 so that the amount of exposure of the CCD 4 falls in a substantially appropriate range.

Preparatory photography is performed after such rough adjustment of the amount of exposure based on the preparatory photometry. A video signal obtained from the CCD 4 by the preparatory photography is utilized to perform calculation of a photometric value and precise exposure control. The highly precise exposure control will be described in detail later.

The digital still camera is also provided with a distance sensor 27 for the purpose of rangefinding, and distance data representing the distance to the subject is applied to the CPU 5. The CPU 5 positions the imaging lens 3 at the focusing position through the imaging lens driving device 25 on the basis of the distance data from the distance sensor 27. The CPU 5 further determines the amount of emission of a strobe device as described later on the basis of the distance to the subject and the F-number.

The digital still camera includes a strobe device in order that a proper amount of exposure is obtained when auxiliary light is required as described later, for example, in the case of indoor photography. The digital still camera enters a strobe photographic mode by setting of the strobe photographing switch 23, in which photography is performed under strobe illumination by the strobe device. The strobe device is driven by a power supply 41.

The strobe device comprises a discharge tube (a strobe) 45, a charging circuit 40 charging for the discharge tube 45, an amount-of-light-emission control circuit 30 for controlling the amount of strobe light-emission, and a stop circuit 46 for stopping firing of the discharge tube 45.

The charging circuit 40 comprises a switch circuit 47 for inhibiting charges from being stored in a main capacitor 43. The switch circuit 47 is controlled by a charging enabling signal outputted from the CPU 5. While the charging enabling signal is at an L level, the switch circuit 47 is off, whereby the main capacitor 43 is prevented from being charged. The charging enabling signal is at an H level when the power supply switch 21 is on and the shutter release button 22 is not depressed, while attaining an L level when the shutter release button 22 is depressed.

When the switch circuit 47 is on, the voltage of the power supply 41 is stepped up by a step-up circuit 42, to charge the main capacitor 43. The charging voltage of the main capacitor 43 is applied to an A/D port of the CPU 5 through a suitable voltage-reducing circuit or a voltage detecting circuit, to be detected. Consequently, the CPU 5 can know completion of the charging of the main capacitor 43.

Since the CPU 5 can detect the charging voltage of the main capacitor 43, a charging voltage of the main capacitor 43 before firing the discharge tube 45 and a charging voltage of the main capacitor 43 after firing the discharge tube 43 are respectively detected, thereby to make it possible to also calculate the amount of light-emission of the discharge tube 45 by the difference between the voltages.

The strobe flash is fired by applying a strobe flash command Xon to a trigger circuit 44. Specifically, the trigger circuit 44 is driven by receiving the strobe flash command Xon from the CPU 5, so that charges stored in the main capacitor 43 are discharged through the discharge tube 45, which starts to be flashed.

The amount of strobe light-emission is represented by a guide number GN. The guide number GN is obtained by the product of the distance to a subject L and an F-number F. That is, $GN = L \times F$ holds. Control data for determining the amount of strobe light-emission corresponding to the guide number is previously stored as its initial value in the memory 6 (see FIG. 4). The guide number GN is calculated in the CPU 5 so that the value of control data for determining the amount of strobe light-emission corresponding to the guide number GN is read out from the memory 6. The value of control data is produced by the CPU 5 so that the discharge tube 45 emits a strobe light in an amount which is represented by the guide number determined as a function of the distance L to the subject and the F-number F.

The amount-of-light-emission control circuit 30 comprises an electronic volume circuit (EVR) 31 including a digital-to-analog (D/A) converter 31A. The value of control data for determining the amount of strobe light-emission is read out from the memory 6 and applied to the EVR 31. In the EVR 31, the value of control data is converted into a voltage, and the voltage is outputted.

Figure 4:
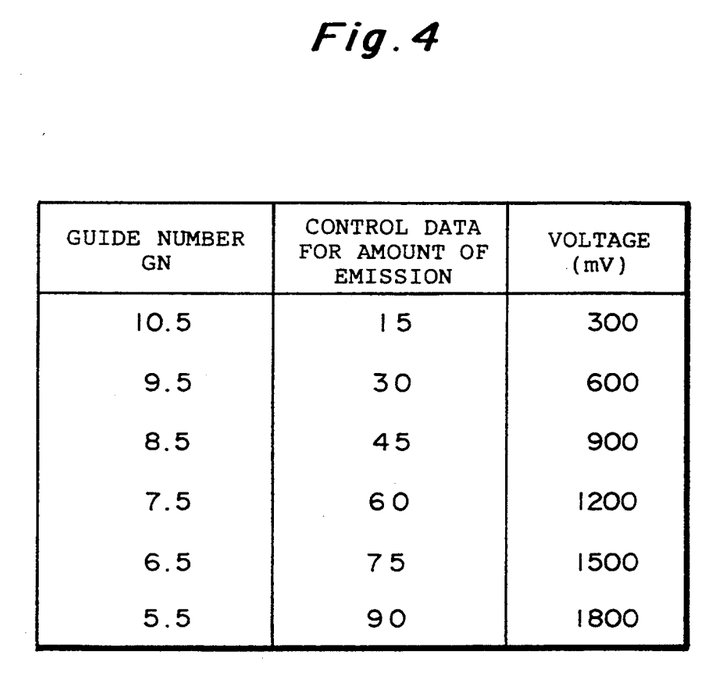
FIG. 4 illustrates a correspondence relation between a guide number and control data for amount of strobe light-emission.

FIG. 4 shows a correspondence between a guide number GN and the value of control data for determining the amount of light-emission.

A guide number GN is determined depending as a function of the distance to a subject and an F-number of the camera. The value of the control data corresponding to the determined guide number is read out from the memory 6. FIG. 4 also shows an output voltage value of the D/A converter 31A. The value of control data for determining of amount of emission is outputted to the EVR 31 from the CPU 5, whereby a voltage corresponding to the value of control data is outputted from the EVR 31.

The amount-of-light-emission control circuit 30 includes a reference power supply 32 and a capacitor 34. An output voltage of the EVR 31 is applied to the capacitor 34 through a resistor 33. There is also provided a switch 35 for discharging charges in the capacitor 34. A reference voltage outputted from the reference power supply 32 is applied to a negative input terminal of a differential amplifier circuit 36, and a terminal voltage of the capacitor 34 is applied to a positive input terminal of the differential amplifier circuit 36.

The switch 35 is normally on, and is turned off by application of the strobe flash command Xon from the CPU 5. When the switch 35 is turned off, the charging of the capacitor 34 is started on the basis of the voltage outputted from the EVR 31.

When the voltage is outputted from the EVR 31 and the switch 35 turns off, predetermined charges are stored in the capacitor 34. When the terminal voltage of the capacitor 34 becomes equal to the reference voltage outputted from the reference power supply 32, a stop signal is outputted from the differential amplifier circuit 36 and is applied to the stop circuit 46, to stop the firing of the discharge tube 45.

In the digital still camera, the dispersion for each circuit cannot be completely eliminated, to cause a slight error. Even if the value of control data corresponding to a calculated guide number is applied to the amount-of-light-emission control circuit 30 in strobe flashing, a correct amount of light represented by the calculated guide number is not necessarily emitted.

In this digital still camera, therefore, the value of control data for determining the amount of light-emission is corrected in the adjustment process after the manufacture but before shipment. The corrected (or updated) value of control data is newly stored in the memory 6 peripheral to the CPU 5. In photography with strobe flashing, the corrected value of control data is applied to the amount-of-light-emission control circuit 30. Therefore, the amount of strobe light emission represented by the guide number is established.

In order to find the corrected data, a microcomputer 60 is connected to the digital still camera 50, and a keyboard 61 for entering data and a display device 62 for displaying data or the like are connected to the microcomputer 60. In FIG. 1, the microcomputer 60, the keyboard 61 and the display device 62 are illustrated. Processing for adjusting the value of control data for determining the amount-of-light-emission will be described in detail later.

Interlaced photography is performed in the CCD 4 by virtue of substrate clear pulses, A field vertical transfer pulses, B field vertical transfer pulses and horizontal transfer pulses, video signals (color-sequential signals of GRGB) of A and B fields are alternately produced for each field, and the produced signals are read out in successive fashion. Drive of the CCD 4 (namely imaging and readout of the video signal) is performed at least at the time of photography and for the purpose of precise photometric processing and rangefinding processing which precede the photography.

The video signals of the A and B fields representing an image of a subject which are outputted from the CCD 4 are applied to a color separating circuit 8 through a correlated-double sampling circuit (CDS) 7. The color separating circuit 8 separates the video signal into color signals of the three primary colors G (green), R (red) and B (blue).

The color signals G, R and B are applied to a gain-controlled amplifier circuit (hereinafter referred to as a "GCA") 9. Although one block is illustrated as the GCA 9 in FIG. 1, GCAs are actually provided for the respective signals R, G and B. In this GCA 9, the color signals R, G and B are subjected to correction of variation in optical transmittance between colors of color filters provided in the CCD 4 (hereinafter referred to as "color-filter variation correction") and white-balance adjustment, after which the resulting signals are applied to a gamma correcting circuit 10.

The color signals R, G and B outputted from the GCA 9 are subjected to tone correction by the gamma correcting circuit 10, after which the resulting signals are inputted to a clamping and resampling circuit 11.

The clamping and resampling circuit 11 clamps the three color signals R, G and B, and converts them back into the color sequential signal GRGB . . . , which coincide with the arrangement of the color filters in the CCD 4, by resampling. The color sequential signal is inputted to a gain control and blanking circuit 12. The gain control and blanking circuit 12 amplifies the color sequential signal to a suitable level for the purpose of recording and adds a blanking signal to the amplified signal. The output signal of the gain control and blanking circuit 12 is applied to an analog-to-digital (A/D) converter 14. Consequently, the signal is recorded on a memory card or the like through a recording processing circuit (not shown).

Precise photometric processing (exposure control) is performed as described above prior to actual photography. The photometric processing is performed utilizing low frequency-components of the video signal obtained from the CCD 4 in preparatory photography.

In order to perform photometric processing, there are provided a $Y_L$ synthesizing circuit 15, a gate circuit 16, an integrating circuit 17, an amplifier circuit 18 and an analog-to-digital (A/D) converter 19 for the purpose of extracting low-frequency components of a video signal representing an image within a photometric area (as described later) provided inside a photographic area of the CCD 4. Output data of the A/D converter 19 is applied to the CPU 5.

Actual photography is performed after photometric processing, exposure control (control of the diaphragm and the shutter) based on the photometric processing and focusing control (positioning of the imaging lens 3). The video signal obtained from the CGD 4 by the actual photography is inputted to the A/D converter 14 through the above described circuits 7, 8, 9, 10, 11 and 12. In the A/D converter 14, the inputted video signal is converted into digital image data. The digital image data is subjected to processing such as Y/C separation and data compression by image data processing circuitry (not shown), after which the resulting image data is recorded on a recording medium such as a memory card.

Description is now made of the photometric processing (and the exposure control based on the photometric processing) prior to the actual photography.

The photometric processing is performed using the $Y_L$ synthesizing circuit 15, the gate circuit 16, the integrating circuit 17 and the amplifier circuit 18 as described above. The output color signals R, G and B of the GCA 9 are applied to the $Y_L$ synthesizing circuit 15.

The CPU 5 outputs a window signal WIND1 for controlling the gate circuit 16 and a reset signal HLRST1 for resetting the integrating circuit 17. The timing of the signals WIND and HLRST will be described later.

The color signals R, G and B outputted from the GCA 9 are added by the $Y_L$ synthesizing circuit 15, which produces a relatively low-frequency luminance signal $Y_L$ (hereinafter referred to simply as a luminance signal $Y_L$). The luminance signal $Y_L$ passes through the gate circuit 16 for a time period during which the window signal WIND1 is applied in a prescribed horizontal scanning interval. The integrating circuit 17 is reset when the reset signal HLRST1 is applied and then, integrates the luminance signal $Y_L$ inputted from the gate circuit 16. The integrated signal from the integrating circuit 17 is amplified by the amplifier circuit 18, after which the amplified signal is fed into the A/D converter 14 immediately before the integrating circuit 17 is reset and is converted into digital integrated data for photometry. The digital integrated data is accepted by the CPU 5.

In the photometric processing according to the present embodiment, average photometry (hereinafter referred to as "AV photometry") for measuring the average brightness within the field of view and spot photometry (hereinafter referred to as SP photometry) for measuring the brightness of a main subject within the field of view are possible. The SP photometry is useful in a case where the brightness of the main subject and the brightness of the background within the field of view differ and it is necessary to set suitable exposure conditions conforming to the difference.

Furthermore, in the present embodiment, the integration performed by the integrating circuit 17, and the analog-to-digital (A/D) converting operation performed by the A/D converter 19 and the addition processing are alternated for each horizontal scanning interval.

Figure 2:
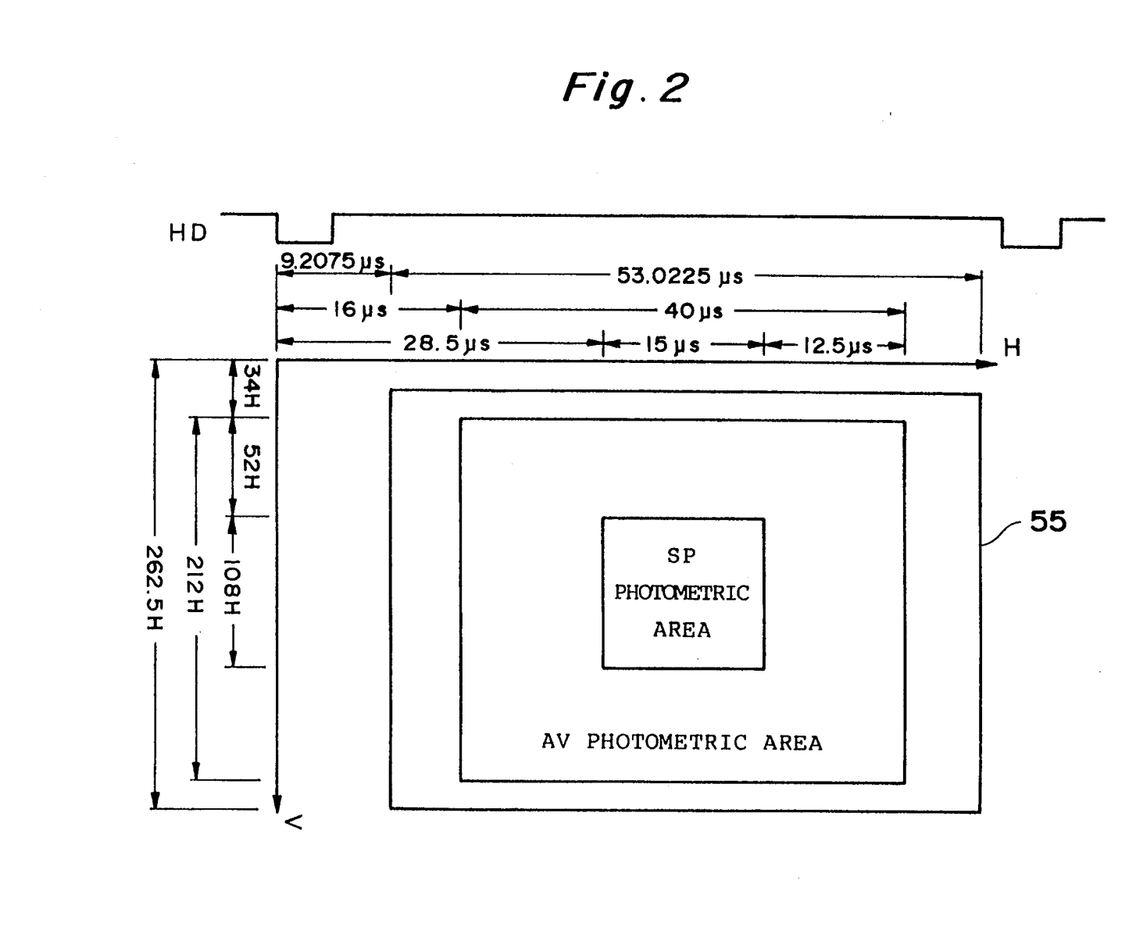
FIG. 2 illustrates photometric areas.

FIG. 2 illustrates an AV photometric area and an SP photometric area which are set within a photographic area 55 of the CCD 4.

The AV photometric area is basically set to cover substantially the entirety of the photographic area 55. In the present embodiment, the AV photometric area is set, in the horizontal direction, to a time period of 40 Ns after an elapse of 16 μs from the leading edge of a horizontal synchronizing signal HD (i.e., the time point where the horizontal scanning interval is started) and, in the vertical direction, to an area from the 35th horizontal scanning line to the 246th horizontal scanning line.

The SP photometric area is set as a small area in an arbitrary position within the photographic area 55. In the present embodiment, the SP photometric area is set at the central portion of the photographic area 55. Further, the SP photometric area is set, in the horizontal direction, to a time period of 15 μs after an elapse of 28.5 μs from the leading edge of the horizontal scanning signal HD and, in the vertical direction, to an area from the 87th horizontal scanning line to the 194th horizontal scanning line.

A memory 6 peripheral to the CPU 5 is provided with a photometric area and a rangefinding area. The photometric area comprises an area storing AV photometric area data and an area storing SP photometric area data.

When the AV photometry is performed, integration is performed every other horizontal scanning line in the AV photometric area. The integration is performed every other horizontal scanning line for the purpose of A/D conversion, resetting of the integrating circuit, and addition processing of data.

Figure 3:
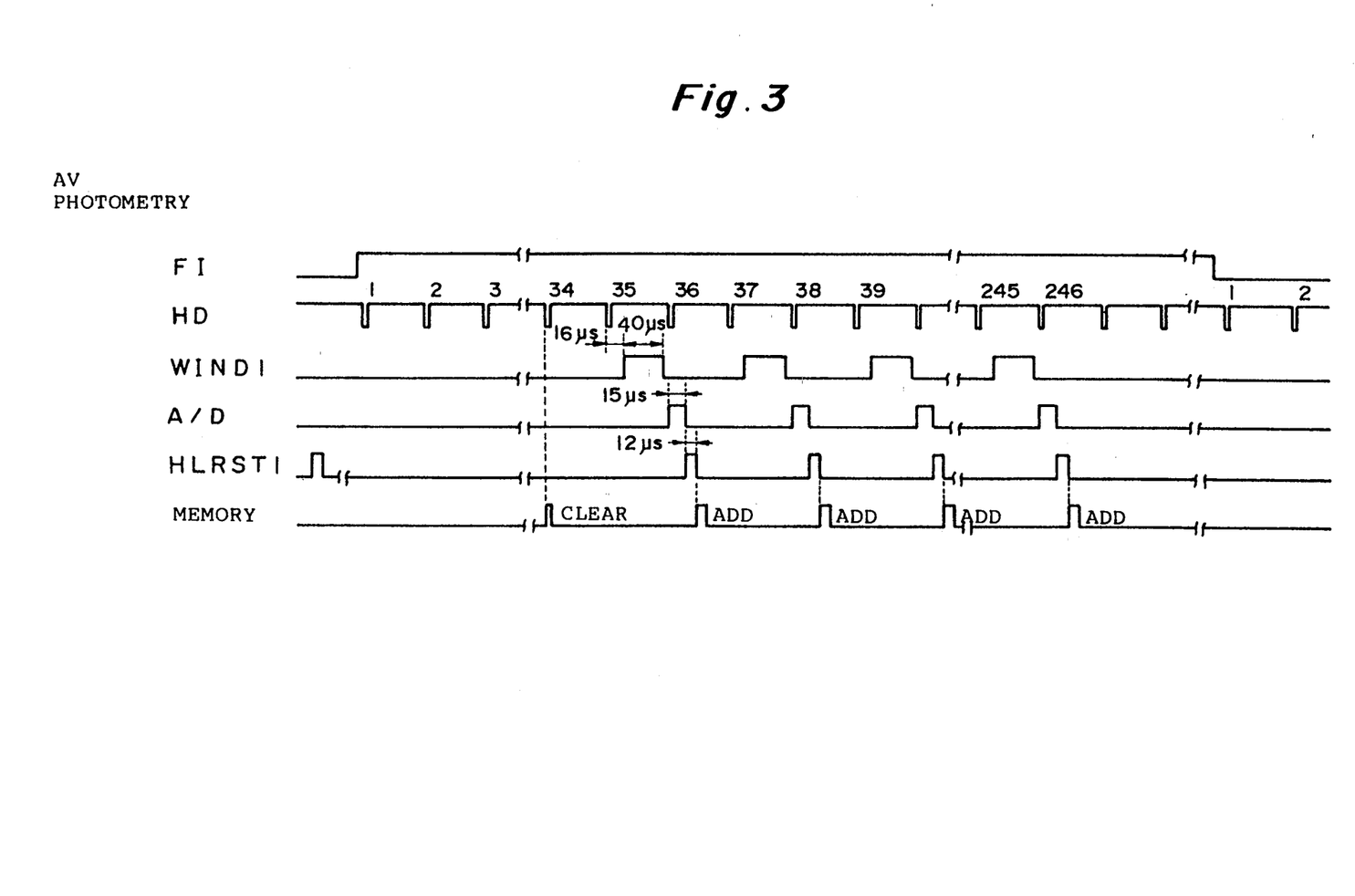
FIG. 3 is a time Chart in a case where photometry is performed.

As shown in FIG. 3, in the AV photometry, a window signal WIND1 having a pulse width of 40 Ns is applied to the gate circuit 16 after an elapse of 16 us from the leading edge of the horizontal synchronizing signal HD in an area from the 34th horizontal scanning line to the 246th horizontal scanning line for every other horizontal scanning interval. The integration of the luminance signal $Y_L$ by the integrating circuit 17, and the A/D conversion of the integrated signal, the resetting of the integration circuit 17 and the addition of the integrated data to the area storing AV photometric area data in the memory in a horizontal scanning interval succeeding a horizontal scanning interval in which the integrating operation is performed are alternately repeated for each horizontal scanning interval.

When the SP photometry is performed, a window signal WIND1 having a pulse width of 15 μs which rises after an elapse of 28.5 μs from the leading edge of the horizontal synchronizing signal HD is applied to the gate circuit 16 in an area from the 87th horizontal scanning line to the 194th horizontal scanning line.

Even in the SP photometry, when the window signal WIND1 having a pulse width of 15 μs is applied to the integrating circuit 17, which integrates the luminance signal $Y_L$ the A/D conversion of the integrated signal, the resetting of the integrating circuit 17, and the addition of the integrated data to the area storing SP photometric area data in the memory are performed in a horizontal scanning interval succeeding a horizontal scanning interval in which the integrating operation is performed.

When the AV photometry is performed, the CPU 5 adds integrated data for one horizontal scanning line obtained on the basis of the window signal WIND1 having a pulse width of 40 μs in the area storing AV photometric area data over one field interval as described later, to calculate an AV photometric value.

When the SP photometry is performed, the CPU 5 adds integrated data for one horizontal scanning line obtained on the basis of the window signal WIND1 having a pulse width of 15 μs in the area storing SP photometric area data over one field interval as described later, to calculate an SP photometric value.

In the digital still camera, focusing control is carried out on the basis of the distance data from the distance sensor 27. The lens driving device 25 is driven on the basis of information concerning the distance to the subject obtained from the distance data, to achieve positioning at the focusing position.

When an image is not focused and blurred, the video signal obtained from the CCD by the photography includes less high-frequency components. If the image is focused, the high-frequency components included in the video signal increases. The high-frequency components included in the video signal is the maximum at the position where the image is properly focused. Focusing control can be also performed on the basis of such a fact.

In this case, there are provided a gate circuit for passing the output signal of the gain control and blanking circuit 12 for a predetermined time period, a band-pass filter for extracting high-frequency components, a detecting circuit, an integrating circuit, and an amplifier circuit. Distance data is calculated, thereby to carry out focusing control on the basis of this data.

Figure 5:
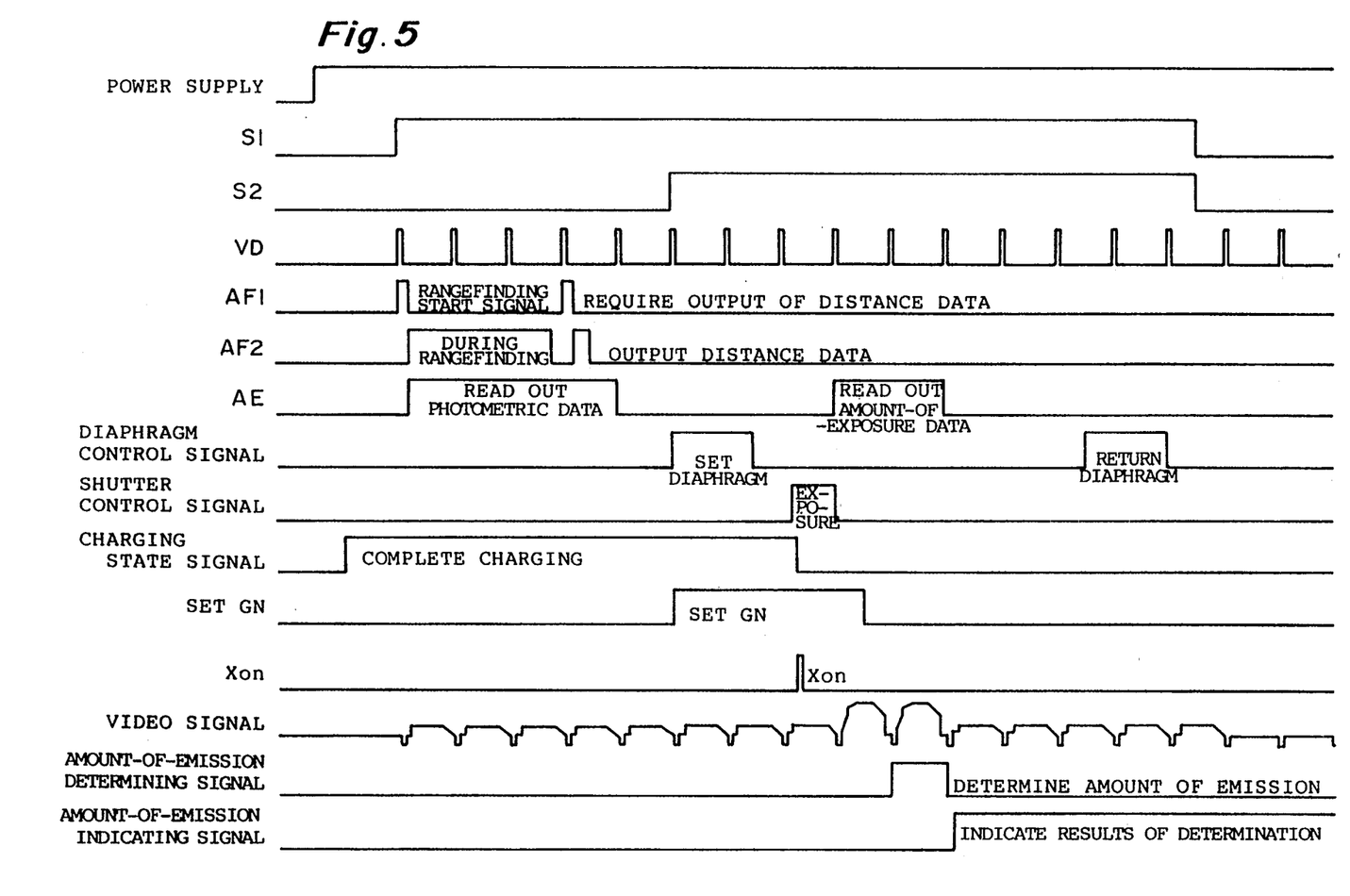
FIG. 5 is a time flow chart showing the procedure of processing for detecting the amount of strobe light-emission.
Figure 6:
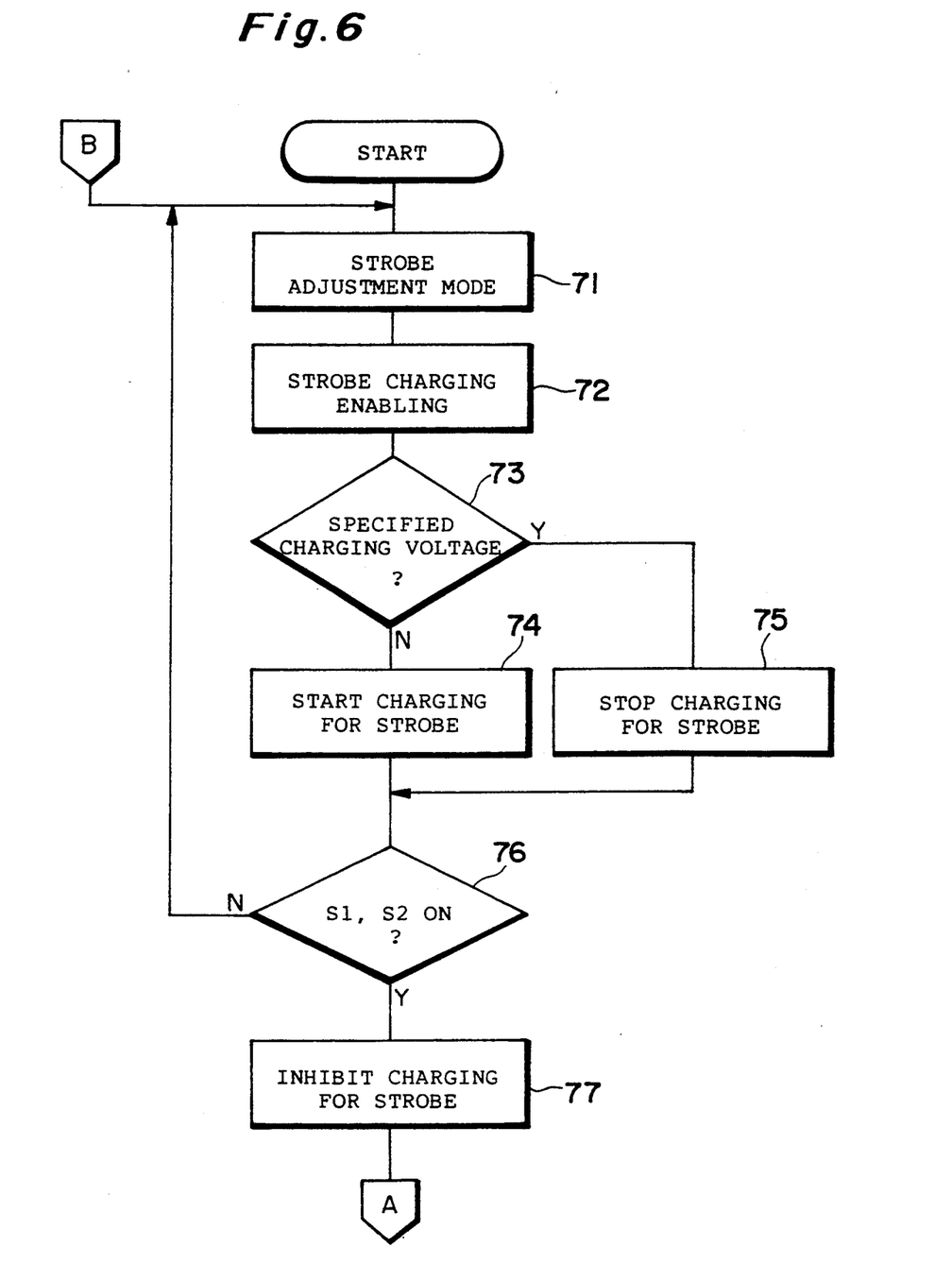
FIG. 6 is a flow chart showing the procedure of processing for correcting control data for amount of light-emission.
Figure 7:
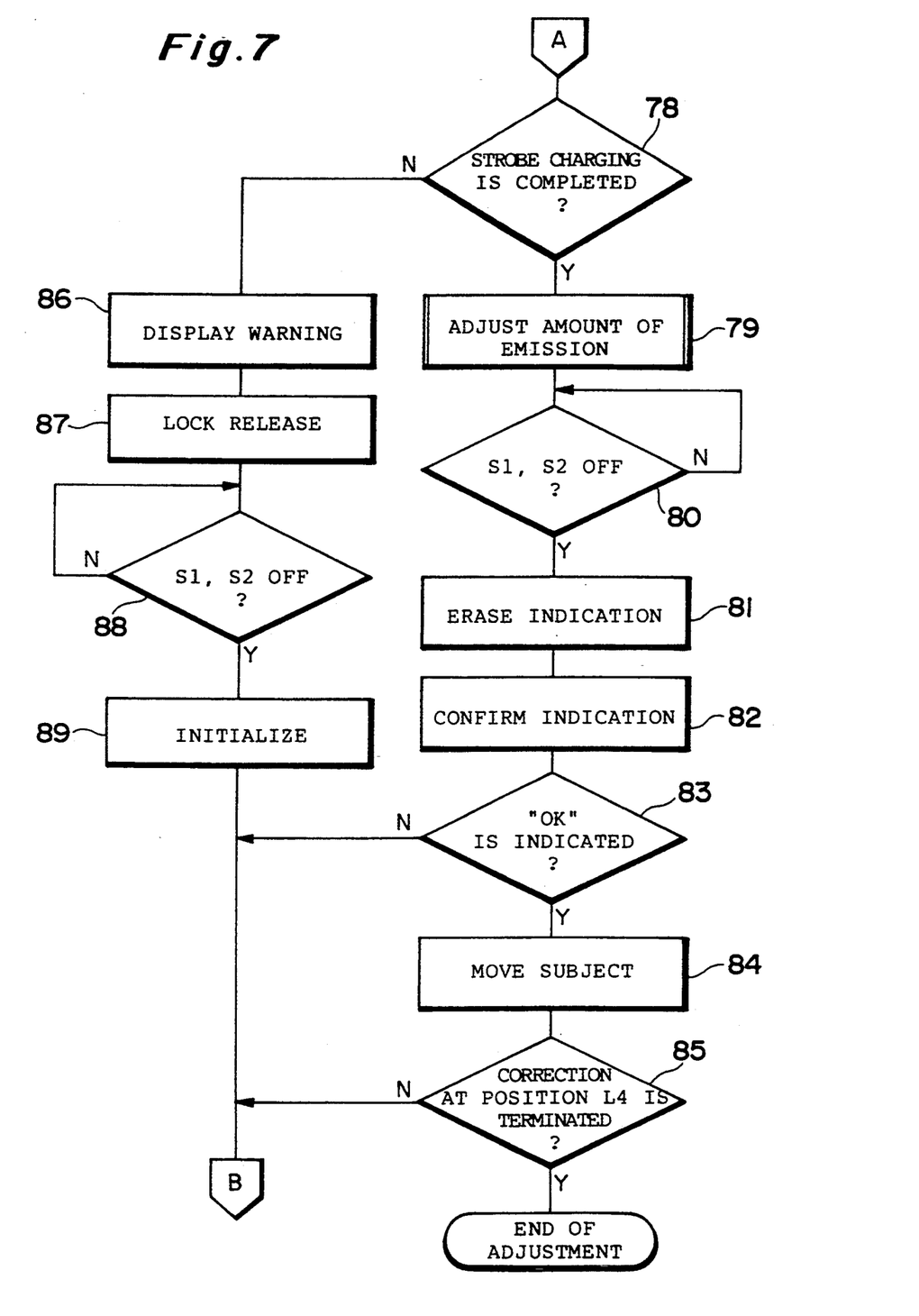
FIG. 7 is a flow chart showing the procedure of processing for correcting control data for amount of light-emission.
Figure 8:
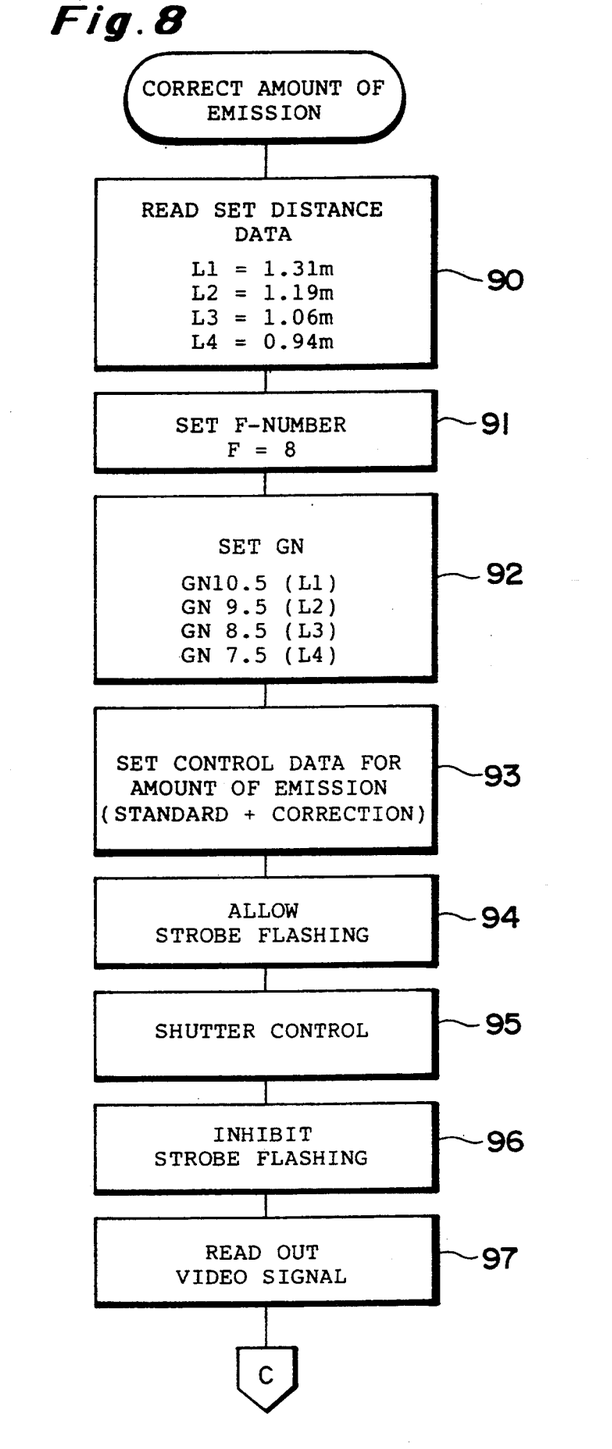
FIG. 8 is a flow chart showing the specific procedure of processing for correcting the amount of light-emission.
Figure 9:
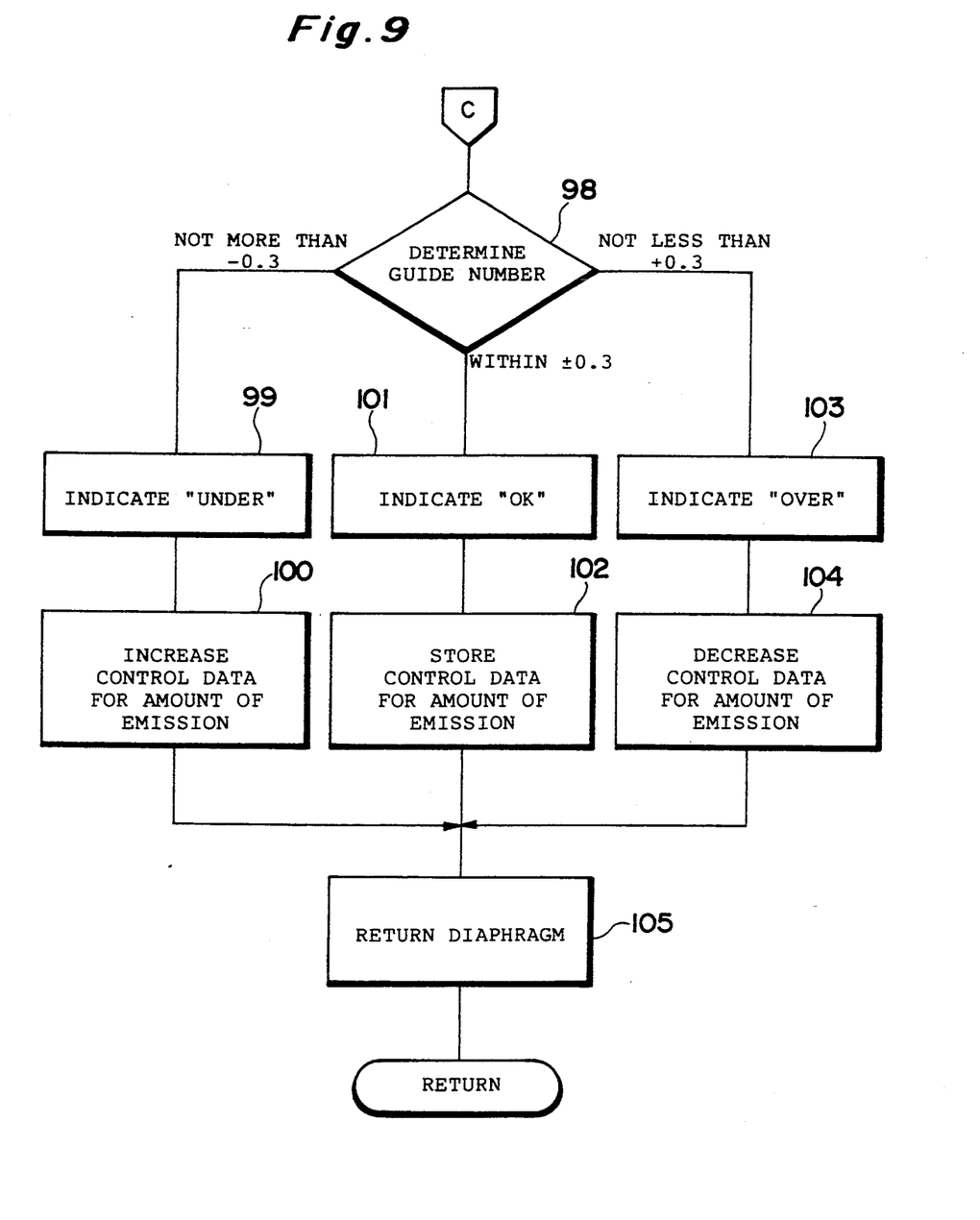
FIG. 9 is a flow chart showing the specific procedure of processing for correcting the amount of light-emission.

FIG. 5 is a time chart at the time of correcting control data for amount of light-emission. FIGS. 6 and 7 are flow charts showing the procedure of processing for correcting the value of control data for determining the amount of light-emission. FIGS. 8 and 9 are flow charts showing the procedure of processing for correcting the amount of light-emission.

Referring mainly to FIGS. 6 and 7, when the value of control data for determining the amount of light-emission in the digital still camera 50 is corrected, the microcomputer 60 is connected to the digital still camera 50. The key board 61 and the display device 62 are connected to the microcomputer 60. Setting of a strobe adjustment mode is entered by the keyboard 61, so that the digital still camera 50 enters a strobe adjustment mode (step 71 in FIG. 6).

When the digital still camera 50 enters the strobe adjustment mode, a charging enabling signal is outputted from the CPU 5 so that the switch circuit 47 is turned on (step 72). A voltage generated by charges accumulated in the capacitor 43 is applied as a charging state signal to the CPU 5, which judges whether or not charges having a specified voltage have been already accumulated in the capacitor 43 (step 73).

If the specified charging voltage is attained (YES at step 73), the switch circuit 47 is turned off, to stop the charging for the strobe (step 75). If the specified charging voltage is not attained (NO at step 73), the switch circuit 47 is turned on so that charges are accumulated in the capacitor 43, to start the charging for the strobe (step 74).

When the shutter release button 22 is depressed (YES at step 76), the switch circuit 47 is turned off, to inhibit the charging for the strobe (step 77). It is then examined from a state where charges are accumulated in the capacitor 43 whether or not the charging for the strobe is completed (step 78).

If the charging for the strobe is not completed (NO at step 78), a warning is displayed on a display portion such as a view finder (not shown) (step 86), and the shutter release is locked (step 87). If the shutter release button 22 is turned off (YES at step 88), the system is initialized (step 89).

When the charging of the strobe is completed (YES at step 78), processing for correcting the amount of strobe light-emission is performed (step 79). The processing for correcting the amount of strobe light-emission is performed by photographing a subject. The position of the subject is changed by a worker so that the distance to the subject becomes L1 (1.31 m), L2 (1.19 m), L3 (1.06 m) and L4 (0.94 m). By the processing for correcting the amount of strobe light-emission, it is indicated on the display device 62 whether the amount of light-emission is smaller or larger than the specified amount of light-emission or is proper. The details of the processing for correcting the amount of strobe light-emission will be described later.

When the processing for correcting the amount of light-emission is terminated and the shutter release button 22 is turned off, the indication of the amount of light-emission on the display device 62 is erased (step 81). If it is confirmed that the indication is erased and the amount of light-emission is proper (YES at step 83), the subject is moved to the next position by the worker. At the next position, the strobe is charged again to perform processing for correcting the amount of light-emission (steps 84 and 85).

If the amount of strobe emission is not proper (NO at step 83), the charging of the strobe is started again to perform processing for correcting the amount of strobe light-emission.

The subject is sequentially moved to the positions L1, L2, L3 and L4. When the processing for correcting the amount of strobe light-emission is terminated at all the positions (YES at step 85), the processing is terminated.

FIGS. 8 and 9 are flow charts showing the specific procedure of processing for correcting the amount of strobe emission.

A subject is placed in the first position. The distance to the first position is L1=1.31 (m). The distance L1 is entered by the keyboard 61, and the entered distance L1 is read in the CPU 5 through the microcomputer 60 (step 90). The distance to the subject may be measured using the distance sensor 27 without being entered by the keyboard 61. The diaphragm 2 is then controlled so that the F-number (F) becomes 8 (step 91).

A guide number is calculated from the distance to the subject and the F-number (step 92). When the distance to the subject is L1, the guide number becomes 10.5 because (guide number: GN)=(F-number: F)×(distance: L). The value of control data for determining the amount of light-emission corresponding to the set guide number GN is read out from the memory 6, and is applied to the amount-of-light-emission control circuit 30 from the CPU 5 (step 93). Referring to FIG. 4, when the guide number GN is, for example, 10.5, the value of control data for amount of light-emission becomes 15.

If strobe flashing is allowed (step 94), an Xon signal is outputted from the CPU 5, so that the strobe is fired to make exposure of the CCD 4 (step 95). A stop signal is applied to the stop circuit 46 by the amount-of-light-emission control circuit 30 so that the amount of light-emission corresponds to the guide number GN, to inhibit the strobe flashing (step 96).

A video signal is then read out from the CCD 4 (step 97), and the video signal read out is inputted to the CPU 5 through the circuits 7, 8, 9, 15, 16, 17, 18 and 19. It is judged on the basis of the inputted data whether or not the level of the amount of strobe emission is proper (step 98). A guide number representing the amount of strobe light-emission is calculated based on the input data for the purpose of judgment.

The guide number GN calculated for strobe flashing in the step 92 is subtracted from the guide number GN calculated on the basis of the input data. If the difference between the guide numbers is not more than—0.3, the actual amount of strobe light-emission is smaller than the proper amount of light-emission, whereby "UNDER" is indicated on the display device 62 (step 99). Consequently, the value of control data for determining the amount of light-emission is increased by 3 (step 100), after which the charging of the strobe is started again to perform the processing for correcting the amount of light-emission.

If the difference between the guide numbers is within 0.3, it is judged that the amount of strobe light-emission is substantially proper, whereby "OK" is indicated on the display device 62 (step 101). The correct value of control data for determining the amount of light-emission corresponding to the guide number GN at this time is stored (step 102).

When the difference between the guide numbers GN is not less than 0.3, the actual amount of strobe light-emission is larger than the proper amount of light-emission, whereby "OVER" is indicated on the display device 62 (step 103). Consequently, the value of control data for determining the amount of light-emission is decreased by 3 (step 104).

If the correction of the amount of emission is terminated, the diaphragm 2 is returned to its home position (step 105).

Such processing for correcting the amount of light-emission is performed with respect to the respective distances L1, L2, L3 and L4, and the values of control data for determining the amount of light-emission defining guide numbers GN 10.5, 9.5, 8.5 and 7.5 corresponding to the respective distances L1, L2, L3 and L4 are respectively adjusted. The adjusted values of control data for determining the amounts of light-emission are stored in the memory 6.

Although in the above described embodiment, data used for directly controlling the strobe flash device is corrected, data for correcting the value of control data for determining the amount of strobe light-emission may be stored.

At the time of the actual photography of a subject, the distance to the subject is measured by the distance sensor 27, and an F-number of the diaphragm 2 is determined depending on the luminance of the subject. A guide number GN is determined as a function of the distance to the subject and the F-number. A value of control data corrected in the above described manner which is represented by the determined guide number GN and is stored in the memory 6 is applied to the light-emission control circuit. Consequently, the strobe light of a proper amount of emission represented by the guide number GN is realized.

What is claimed is:

1. A device for adjusting control data for determining the amount of strobe light-emission in a still video camera having a strobe flash device, comprising:

photographing means for photographing a subject to output a video signal representing an image of said subject;

guide number calculating means for calculating a guide number as a function of the distance to said subject from said photographing means and an F-number of said photographing means;

storing means for storing an initial value of control data for determining the amount of strobe light-emission of said strobe flash device corresponding to said guide number;

strobe light-emission control means for reading out from said storing means said initial value of said control data and firing said strobe flash device to emit an amount of light corresponding to said guide number;

strobe-light-emission detecting means for detecting the actual amount of light emitted by said strobe flash device under control of said strobe light-emission control means;

said actual amount of light emitted by said strobe flash device and said amount determined as corresponding to said guide number having an allowable range of difference therebetween;

judging means for judging whether or not said allowable range of difference has been exceeded; and correcting means for updating said initial value of control data in said storing means in response to a judgment by said judging means that said allowable range of difference has been exceeded to bring said difference within said allowable range.

2. The device for adjusting control data as set forth in claim 1, wherein said correcting means includes incremented control means for incrementally and repeatedly adjusting said initial value of control data in said storing means and causing repeated firing of said strobe flash device until said judging means determines that said allowable range of difference has been satisfied.

3. A still video camera comprising:

rangefinding means for measuring the distance to a subject to be photographed, guide number calculating means for calculating a guide number as a function of the distance to the subject measured by said rangefinding means and an F-number of said camera;

a strobe flash device for projecting strobe light on the subject;

storing means for storing values of control data corresponding to said guide numbers for determining the desired amount of strobe light-emission including correcting means for updating such stored values so that the actual amounts of strobe light-emission correspond to the desired amounts represented by said guide numbers to within an allowable range;

strobe light-emission control means for reading from said storing means said corrected values of control data to control the strobe flashing by said strobe flash device;

photographing means for photographing the subject under the strobe flashing by said strobe flash device to output a video signal representing an image of the subject; and recording means for recording the video signal outputted from said photographing means on a recording medium.

4. A method of adjusting the value of control data for determining the amount of strobe light-emission in a still video camera having a strobe flash device, comprising the steps of:

storing an initial value of said control data for controlling the amount of strobe light-emission of said strobe flash device in correspondence to a guide number;

calculating the guide number as a function of the distance to a subject to be photographed and an F-number of said video camera;

reading out said stored initial value of said control data corresponding to said calculated guide number to fire a strobe flash for generating an amount of strobe light-emission corresponding to said initial value of control data;

photographing said subject under the strobe flashing to obtain a video signal representing an image of the subject;

detecting the amount of strobe light-emission on the basis of the obtained video signal;

judging whether or not the difference between the detected amount of strobe light-emission and the amount of strobe light-emission represented by the calculated guide number is within an allowable range; and correcting said initial value of said control data so that said difference between said amounts of strobe light-emission is within said allowable range.

5. The method of adjusting the value of control data for determining the amount of strobe light-emission in a still video camera as defined in claim 4, wherein:

said storing an initial value of said control data includes plural initial values for a like plurality of guide numbers;

said guide numbers are calculated from a respective plurality of distances to a subject to be photographed; and each of said initial values of said control data are corrected so that the differences between said detected amounts of strobe-light emission at each of said plurality of distances and the amount of light represented by a respective calculated guide number is within said allowable range.

6. The method of adjusting the value of control data for determining the amount of strobe light-emission in a still video camera according to claim 5, further comprising the step of repeating the processing for strobe flashing, the processing for detecting the amount of strobe light-emission, the processing for judgment, and the processing for correction until it is judged that said difference between the amounts of strobe light-emission is within said allowable range for said values of control data, respectively, for said plurality of distances.

7. The method of adjusting the value of control data for determininq the amount of strobe light-emission in a still video camera according to claim 4, further comprising the step of repeating the processing for strobe flashing, the processing for detecting the amount of strobe light-emission, the processing for judgment, and the processing for correction until it is judged that said difference between the amounts of strobe light-emission is within said allowable range.

8. A method of operating and controlling the amount of strobe light-emission in a still video camera having a strobe flash device, comprising the steps of:

measuring the distance to a subject to be photographed;

calculating a guide number as a function of the measured distance to said subject and an F-number of said camera as an initial representation of a desired amount of light-emission;

generating and storing an initial value of said control data corresponding to said guide number;

firing said strobe flash device and determining the actual amount of light emitted in correspondence to said initial value of control data;

comparing said actual value to said desired amount of light-emission and correcting said initial value of said control data until said comparison is within an allowable tolerance range;

storing said corrected value of control data;

reading from said storing means the corrected value of control data for determininq the desired amount of strobe light-emission corresponding to the calculated guide number;

firing the strobe flash by said strobe flash device on the basis of the corrected value of control data;

photographing said subject under the strobe flashing to obtain a video signal representing an image of the subject; and recording the obtained video signal on a recording medium.

9. The method of adjusting the value of control data for determining the amount of strobe light-emission in a still video camera as defined in claim 8, wherein:

said storing an initial value of said control data includes plural initial values for a like plurality of guide numbers;

said guide numbers are calculated from a respective plurality of distances to a subject to be photographed; and each of said initial values of said control data are corrected so that the differences between said detected amounts of strobe-light emission at each of said plurality of distances and the amount of light represented by a respective calculated guide number is within said allowable range.

10. The device for adjusting control data as set forth in claim 9, wherein said correcting means includes incremented control means for incrementally and repeatedly adjusting said initial value of control data in said storing means and causing repeated firing of said strobe flash device until said judging means determines that said allowable range of difference has been satisfied for said values of control data, respectively, for said plurality of distances.

* * * * *